Nov. 14, 1950  E. D. HARSHBARGER  2,530,164
WATERWORKS VALVE POSITION INDICATOR
OPERATING MECHANISM
Filed April 3, 1948  2 Sheets-Sheet 1
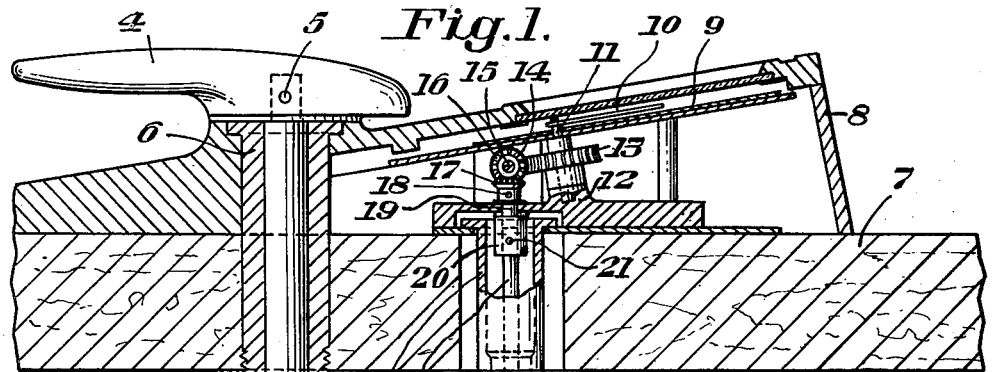
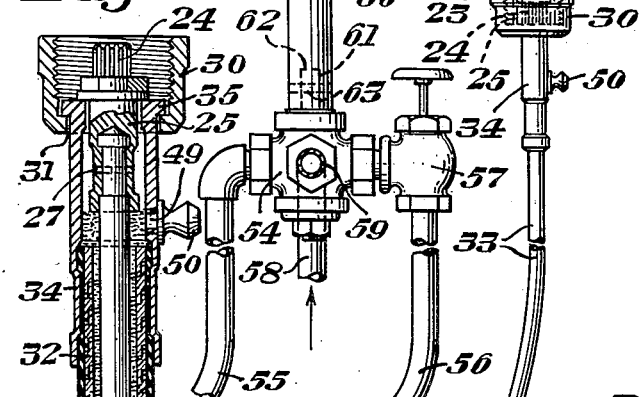
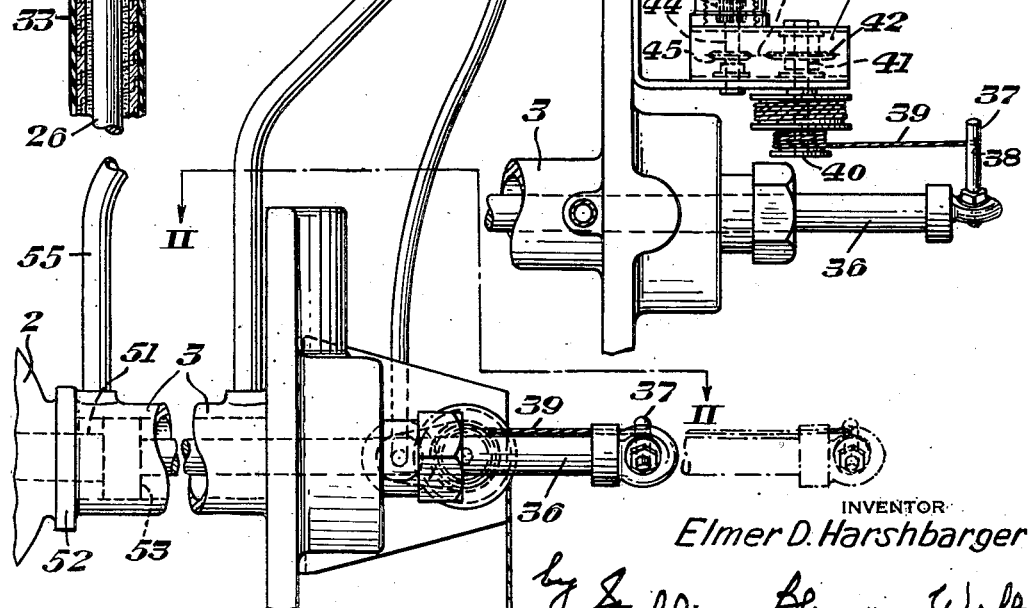
INVENTOR
Elmer D. Harshbarger Nov. 14, 1950

E. D. HARSHBARGER 2,530,164

WATERWORKS VALVE POSITION INDICATOR
OPERATING MECHANISM

Filed April 3, 1948

INVENTOR
Elmer D. Harshbarger
By Hoopes, Leonard & Glenn,
his attys,

Patented Nov. 14, 1950

2,530,164

UNITED STATES PATENT OFFICE 2,530,164

WATERWORKS VALVE POSITION INDICATOR OPERATING MECHANISM

Elmer D. Harshbarger, Pittsburgh, Pa.

Application April 3, 1948, Serial No. 18,803

2 Claims. (Cl. 116—125)

This invention relates to water works valve position indicator operating mechanism. It relates to mechanism for operating the position indicator of a water works valve which obviates disadvantages of prior water works valve position indicator operating mechanism.

In a water works (the term "water works" is used herein as a term of broad definition to contemplate broadly water supply systems, filtration plants and other operations in which water is handled in substantial quantities) the flow of water, as, for example, to and from filtration units, is controlled by valves which are ordinarily hydraulically actuated in their movements between open and closed positions and means for operating the valve actuating mechanism are provided at a control station remote from the valves themselves. It is, of course, important that the operator at the control station know at all times the position of each valve relative to its open and closed positions. It has been customary to provide a valve position indicator for each valve separate from the valve operating mechanism, the valve position indicator being disposed at the control station. The position indicator for each valve is operated from the valve or from a portion of the valve mechanism which partakes of movement consonant with the movement of the valve and which may be imparted to the indicator.

Heretofore it has been customary to control water works valve position indicators by operating mechanism consisting of bronze cables and pulleys. The bronze cables have been reeved over a more or less complicated system of pulleys to transmit the motion of the valve in opening and closing to the valve position indicator at the control station. The valve position indicator generally comprised a dial, a pointer movable over the dial and a system of sprockets and gears operated by the bronze cable to cause the pointer to move consonantly with and throughout the movement of the valve.

Bronze cable and pulley systems such as above mentioned have been used for fifty years or more for operating valve position indicators in water works. They have been unsatisfactory both because of relatively high initial and upkeep cost and because of difficulty of installation; moreover, the cables and pulleys have interfered with much needed head room and working space required in maintenance work in the water works. However, because of the dampness due to heavy condensate on the outsides of pipes carrying cold water in a warm building it has been thought necessary to use the bronze cable and pulley systems.

I have devised a water works valve position indicator operating mechanism which obviates the disadvantages of the mechanisms heretofore employed and to which I have referred above. I provide, in a water works having a water flow control valve and an indicator at a location remote from the valve showing the position of the valve relative to open and closed positions, connections between the valve and the indicator whereby the indicator is operated upon operation of the valve, including a tubular sheath and a flexible shaft within the sheath connected at one end with the valve so as to be turned upon operation of the valve and connected at the other end with the indicator so as to operate the indicator upon turning of the shaft. Desirably the tubular sheath is made liquid tight to inhibit the passage of moisture to the interior thereof and hence reduce corrosion of the flexible shaft. I prefer to fill the sheath about the shaft with rust-inhibiting liquid whereby the proper operation and prolonged life of the valve position indicator operating mechanism are assured.

Other details, objects and advantages of the invention will become apparent as the following description of a present preferred embodiment thereof proceeds.

In the accompanying drawings I have shown a present preferred embodiment of the invention in which Figure 1 is a fragmentary elevational view partly in vertical cross section and partly diagrammatic of water works valve actuating mechanism, a valve position indicator therefor and operating mechanism for the indicator;

Figure 2 is a fragmentary horizontal cross-sectional view taken on the line II—II of Figure 1;

Figure 3 is a fragmentary vertical cross-sectional view to enlarged scale of a portion of the operating mechanism.

Figure 4:
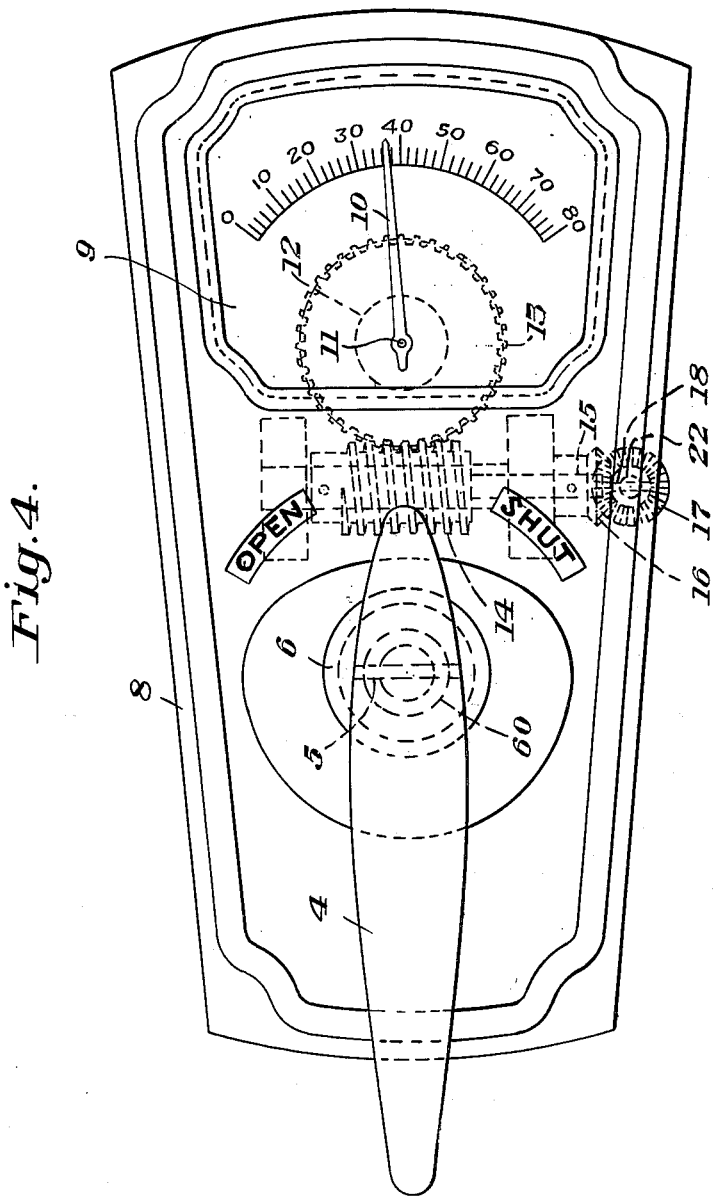
Figure 4 is a plan view to enlarged scale of the structure shown in Figure 1.

Referring now more particularly to the drawings, there is shown diagrammatically a fragment of a valve casing 2 disposed in a water flow conduit and containing a valve which is adapted to be closed to prevent flow of water through the conduit and opened to permit flow of water through the conduit. Since the valve casing and the valve therein may be of conventional design they are not shown in detail. The valve may, for example, be a gate or plate valve movable rectilinearly at right angles to the line of flow and adapted to assume a position intersecting and sealing the flow conduit when the valve is closed and a position offset from the flow conduit when the valve is open. The direction of movement of the valve between open and closed positions will, for purposes of illustration, be deemed to be from right to left and vice versa viewing Figure 1.

Connected with the valve casing 2 is a cylinder 3 whose axis extends parallel to the direction of movement of the valve between open and closed positions. The valve has a stem 51 which is fastened to the valve plate and extends from the casing 2 into the cylinder 3 through a cylinder head 52 containing suitable packing so that the space within the cylinder 3 is substantially sealed from the space within the valve casing 2. The stem 51 carries a piston 53 operatively fitting in the cylinder 3 and adapted by means presently to be described to be moved axially of the cylinder. Since the piston 53 is connected with the valve plate by the stem 51 movement of the piston is imparted to the valve. When the piston moves to one extreme position in the cylinder 3 the valve is in one of its extreme positions and when the piston moves to the opposite extreme position in the cylinder the valve is in the other of its extreme positions. For example, viewing Figure 1, the valve may be fully open when the piston is in its extreme right-hand position and fully closed when the piston is in its extreme left-hand position. The valve may assume a partly open position which would correspond to a position of the piston intermediate its extreme positions in the cylinder 3.

I provide a four-way control valve 54 which is suitably mounted in the water works and from which pipes 55 and 56 lead to the cylinder 3 at the left-hand and right-hand ends thereof, respectively, viewing Figure 1. A manually operable valve 57 is disposed between the four-way control valve 54 and the pipe 56. Hydraulic fluid under pressure, as for example, water, enters the valve 54 through a pipe 58. A discharge pipe 59 leads from the valve 54 to discharge fluid therefrom. The valve 54 has three positions. In the first position fluid under pressure is admitted to the pipe 55 and the pipe 56 is connected with the discharge pipe 59. When the four-way valve is in that position the piston 53 is moved to its extreme right-hand position, viewing Figure 1, in the cylinder 3 and the valve in the casing 2 is moved to fully open position. The second position of the four-way valve 54 is that in which the fluid under pressure entering through the pipe 58 is admitted to the pipe 56 and the pipe 55 is connected with the discharge pipe 59. When the four-way valve is in that position the piston 53 is moved to its extreme left-hand position in the cylinder 3 and the valve in the casing 2 is moved to closed position. The third position of the four-way valve 54 is a position half way between the first position and the second position in which there is no flow through it. Thus the valve 54 may be turned to either the first or second position until the piston 53 has moved through only part of its movement in the cylinder 3 whereupon the valve 54 may be moved to the third or neutral position which stops the piston 53 in an intermediate position and hence positions the valve in the casing 2 in a position in which it is partly open.

The valve 54 is operated by a rotatable shaft 60 having at its lower end a socket 61 fitting over the upwardly projecting valve stem 62, a pin 63 extending through the stem and socket to hold the shaft 60 in nonrotative position relatively to the stem 62. The shaft 60 is adapted to be turned by a handle 4 fastened to the upper end of the shaft 60 by a pin 5.

The valve in the casing 2 may be disposed far down within the water works, perhaps thirty to fifty feet away from the handle 4. Although no mounting is shown for the valve 54, it is to be understood that it will be appropriately mounted to be operated by the shaft 60. The shaft 60 is journaled in a bushing 6 in a control panel 7.

As above explained, it is necessary for the operator at the control station to know with some degree of accuracy the position of the valve in the casing 2 at all times. To this end there is mounted on the panel 7 a valve position indicator including a housing 8 on whose face is a dial 9 over which operates a pointer 10 fixed to a shaft 11 whose upper end viewing Figure 1 projects through the dial 9. The dial is appropriately graduated to indicate the position of the valve and the pointer 10 through mechanism presently to be described is moved over the dial upon opening and closing movements of the valve so that it at all times indicates the valve position.

The shaft 11 is mounted for rotation in a bearing 12 and has fixed thereto a worm wheel 13 which meshes with a worm 14 fixed to a shaft 15. Also fixed to the shaft 15 is a bevel gear 16 which meshes with a bevel pinion 17 fixed by a pin 18 to a projection 19 of a fitting 20 which in turn is fixed by a pin 21 to a shaft 22 having at its lower extremity a connecting member 23 which is of hollow cylindrical shape with internal splines adapted to fit over and mesh with a connecting member 24 at the upper extremity of a fitting 25 which is fastened to a flexible shaft 26 by a pin 27. The fitting 20 and shaft 22 are disposed within a housing 28 mounted in the panel 7 and whose lower end is closed by a housing member 29 disposed about the lower end of the shaft 22 and the connecting member 23. The lower extremity of the member 29 is closed by a cap 30 threaded thereto except that the cap 30 has therein a central opening 31 through which the fitting 25 passes.

Surrounding the flexible shaft 26 is a tubular flexible sheath 32 which may be of metal and itself of known construction. The sheath 32 has disposed thereabout a tube 33 of flexible waterproof material such as rubber, plastic, or the like, whereby the sheath within which the flexible shaft 26 operates is made liquid tight. The upper ends of the sheath 32 and tube 33 are disposed within a sleeve 34 with which they make a liquid tight connection. At its upper end the sleeve 34 has an enlargement 35 entering the cap 30.

Connected with the piston 53 is a stem 36 adapted to move axially, i. e., from left to right and vice versa, in Figure 1 upon opening and closing movements of the valve in the casing 2. The stem 36 is shown in one extreme position in solid lines and in another extreme position in chain lines in Figure 1. For example, the solid line position of the stem 36 may correspond to the closed position of the valve and the chain line position of the stem 36 may correspond to the open position of the valve. An intermediate position of the stem 36 would correspond to a position of the valve in which the latter is partly open.

At its outer extremity the stem 36 has a laterally projecting post 37 to which is fastened at 38 the end of a flexible operating member such as a wire, cord or cable 39 which is wound about a drum 40. The drum 40 is fixed to the shaft 41. Also fixed to the shaft 41 is a sprocket 42. The shaft 41 is mounted on a housing 43. Also mounted in the housing 43 with its axis parallel to the axis of the shaft 41 is a shaft 44 to which is fixed a sprocket 45. A sprocket chain 46 is trained about the sprockets 42 and 45. The shaft 44 carries a fitting 47 which may be the same as the fitting 23 and with which the lower end of the flexible shaft 26 is connected in a manner similar to the manner in which the upper end of that shaft is connected to the member 23. A cap 48 is applied to the housing 43 and is analogous in structure and function to the cap 30 at the upper end of the flexible shaft.

The sheath for the flexible shaft is thus seen to be connected in liquid-proof relation to the housings at the upper and lower extremities of the shaft. In this way the shaft is protected against moisture and hence against rust so that its life is greatly increased and satisfactory operating conditions maintained.

I prefer to dispose rust inhibiting liquid about the flexible shaft in the sheath. This can be done because, as above explained, the sheath is liquid tight. An opening 49 may be provided in the sleeve 34 through which a rust inhibiting liquid such as a light grease preferably with a tar base or any other well known fluid rust inhibitor preferably tar-containing may be introduced into the space between the flexible sheath and the flexible shaft. The opening 49 may be closed by a cap 50. Thus the space within the sheath not occupied by the flexible shaft may be filled with rust inhibiting liquid and the opening 49 may be closed by the cap 50. Any leakage which might occur may be made up for by introducing replenishing rust inhibitor through the opening 49.

My valve position indicator operating mechanism is very easy to install, not requiring the mounting of pulley carrying brackets in relatively inaccessible places, and the operating mechanism is altogether much more satisfactory in operation than the prior mechanisms employed for operating valve position indicators in water works. Especially when the flexible sheath in which the flexible shaft operates is filled with rust inhibiting liquid as above explained the operation is smooth and efficient with a minimum of servicing being required. The rust inhibitor is introduced primarily for that purpose but also incidentally serves as a lubricant to reduce friction between the flexible shaft and the sheath.

An important advantage of my valve position indicator operating mechanism is the ease with which it may be installed. The flexible shaft and sheath need simply be properly connected at their upper and lower ends to the cooperating mechanisms above described and the mechanism is ready for use. It is not necessary to mount or attach the flexible element, which automatically assumes a neutral position between its ends. It may, however, if desired, be disposed behind columns or pass through straps fastened to portions of the structure. The time required for installation of my valve position indicator operating mechanism is a very small fraction of the time required for installation of the bronze cable and pulley systems which have been employed for this purpose for the past fifty years.

It is found that the slight amount of torsion which must be imparted to the flexible shaft when it is first placed under stress due to a movement of the valve does not result in substantial inaccuracy of the reading of the pointer 10 on the dial 9. The setting up of the initial torsion in the flexible shaft requires only a negligible movement of the valve. Likewise the relieving of the torsion when the valve moves in the opposite direction is accomplished by only a negligible movement of the valve. My valve position indicator operating mechanism has been commercially used and has been found fully satisfactory and accurate.

While I have shown and described a present preferred embodiment of the invention it is to be distinctly understood that the invention is not limited thereto but may be otherwise variously embodied within the scope of the following claims.

I claim:

1. In a water works having a water flow control valve and an indicator at a location remote from the valve showing the position of the valve relative to open and closed positions, connections between the valve and the indicator whereby the indicator is operated upon operation of the valve including a flexible tubular liquid tight sheath and a flexible shaft within the sheath connected at one end with the valve so as to be turned upon operation of the valve and connected at the other end with the indicator so as to operate the indicator upon turning of the shaft.

2. In a water works having a water flow control valve and an indicator at a location remote from the valve showing the position of the valve relative to open and closed positions, connections between the valve and the indicator whereby the indicator is operated upon operation of the valve including a flexible tubular liquid tight sheath, a flexible shaft within the sheath connected at one end with the valve so as to be turned upon operation of the valve and connected at the other end with the indicator so as to operate the indicator upon turning of the shaft and rust inhibiting liquid about the shaft in the sheath.

ELMER D. HARSHBARGER.

REFERENCES CITED

The following references are of record in the file of this patent:

UNITED STATES PATENTS

| Number | Name | Date |
|---|---|---|
| 1,537,670 | Hammond | May 12, 1925 |
| 1,663,041 | Dunbaugh, Jr. | Mar. 20, 1928 |

FOREIGN PATENTS

| Number | Country | Date |
|---|---|---|
| 172,084 | England | Nov. 24, 1921 |
| 172,085 | England | Nov. 24, 1921 |